United States Patent [19]
Flick

[11] Patent Number: 6,140,939
[45] Date of Patent: *Oct. 31, 2000

[54] BIOMETRIC CHARACTERISTIC VEHICLE CONTROL SYSTEM HAVING VERIFICATION AND RESET FEATURES

[76] Inventor: Kenneth E. Flick, 5236 Presley Pl., Douglasville, Ga. 30135

[ * ] Notice: This patent is subject to a terminal disclaimer.

[21] Appl. No.: 09/034,702

[22] Filed: Mar. 4, 1998

Related U.S. Application Data

[63] Continuation-in-part of application No. 08/622,515, Mar. 25, 1996, which is a continuation-in-part of application No. 08/423,570, Apr. 14, 1995, Pat. No. 5,654,688.

[51] Int. Cl.[7] .................................................. G08C 19/00
[52] U.S. Cl. .................... 340/825.69; 340/539; 340/426; 340/825.72; 340/825.31
[58] Field of Search ................... 340/825.69, 825.72, 340/825.37, 825.32, 426, 825.3, 539; 341/176, 174

[56] References Cited

U.S. PATENT DOCUMENTS

| | | |
|---|---|---|
| 4,383,242 | 5/1983 | Sassover et al. . |
| 4,881,148 | 11/1989 | Lambropoulos et al. . |
| 4,928,098 | 5/1990 | Dannhaeuser . |
| 4,975,969 | 12/1990 | Tal . |
| 5,049,861 | 9/1991 | Stouffer . |
| 5,055,701 | 10/1991 | Takeuchi . |
| 5,099,226 | 3/1992 | Andrews . |
| 5,103,221 | 4/1992 | Memmola . |
| 5,146,215 | 9/1992 | Drori . |
| 5,243,322 | 9/1993 | Thompson et al. . |
| 5,252,966 | 10/1993 | Lambropoulos et al. . |
| 5,278,547 | 1/1994 | Suman et al. . |
| 5,365,225 | 11/1994 | Bachhuber . |
| 5,406,274 | 4/1995 | Lambropoulos et al. . |
| 5,412,379 | 5/1995 | Waraksa et al. . |
| 5,442,341 | 8/1995 | Lambropoulos . |
| 5,469,506 | 11/1995 | Berson et al. . |
| 5,513,105 | 4/1996 | Krones . |
| 5,563,579 | 10/1996 | Carter . |
| 5,654,688 | 8/1997 | Allen et al. . |
| 5,867,802 | 2/1999 | Borza ........................................ 701/35 |
| 5,920,642 | 2/1999 | Merjanian ............................... 382/126 |

FOREIGN PATENT DOCUMENTS

| | | | |
|---|---|---|---|
| 0 535 555 A1 | 9/1992 | European Pat. Off. ........ | E05B 49/00 |
| 43 25 221 A1 | 7/1993 | Germany ....................... | B60R 25/00 |
| 91/15645 | 10/1991 | WIPO ............................. | E05B 49/00 |

OTHER PUBLICATIONS

Lexus, 1995 *Repair Manual SC400 SC300*, vol. 3, (first printing Jan. 10, 1994) pp. BE–479–BE–522.

*Primary Examiner*—Brian Zimmerman
*Assistant Examiner*—Anthony A. Asongwed
*Attorney, Agent, or Firm*—Allen, Dyer, Doppelt, Milbrath & Gilchrist, P.A.

[57] ABSTRACT

A control system for a vehicle includes a controller for learning a unique biometric characteristic of an individual to define a learned individual capable of causing performance of a function associated with the vehicle, for example. The controller performs biometric characteristic verification to generate an indication relating to whether a new individual has been learned by the controller. The control system is advantageously used, in one embodiment, for a vehicle security system. Biometric characteristic verification may also be incorporated in a remote keyless entry system, and remote engine starting system, for example. In one embodiment, the biometric characteristic verification is based upon the controller being recently entered into the biometric characteristic learning mode. According to another embodiment, the biometric characteristic verification is based upon a number of learned individuals, a change in that number, or a change in a learned biometric characteristic. The indication may be provided at the vehicle or remote therefrom by any of a light, a visual display, a vibration transducer, a speech message generator, and an audible signal generator, for example. A previous set of authorized biometric characteristics may be readily reset or restored to operate the system if unauthorized biometric characteristics have been more recently added.

70 Claims, 8 Drawing Sheets

6,140,939

BIOMETRIC CHARACTERISTIC VEHICLE CONTROL SYSTEM HAVING VERIFICATION AND RESET FEATURES

RELATED APPLICATION

The present application is a continuation-in-part application of U.S. patent application Ser. No. 08/622,515 filed Mar. 25, 1996, now pending which, in turn, is a continuation-in-part of Ser. No. 08/423,570 filed Apr. 14, 1995 now U.S. Pat. No. 5,654,688.

FIELD OF THE INVENTION

The present invention relates to the field of control systems, and more particularly, to a vehicle control system, such as for vehicle security.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. The remote transmitter may be used to arm and disarm the vehicle security system or provide other remote control features from a predetermined range away from the vehicle.

Other vehicle security systems may be associated with the ignition of the vehicle. More particularly, one type of conventional vehicle security system includes a passive transponder either carried by the keychain or embedded in the ignition key. When the transponder is positioned adjacent the ignition switch, the transponder is inductively powered and transmits a uniquely coded signal to a receiver in the vehicle. When a properly coded transponder is detected, the vehicle engine may be allowed to start, for example. In other words, an ignition or fuel cutoff is normally operative to prevent the engine from starting or running, unless the proper transponder is sensed. Accordingly, vehicle security is increased. In addition, the security system may have multiple transponders capable of disabling the ignition or fuel cutoff to thereby permit operation of the vehicle. These uniquely coded transponders may be added or deleted from the vehicle controller. Unfortunately, the owner of the vehicle may not know that a transponder has been added without authorization.

Another variation of vehicle security systems includes a reader or sensor, such as for sensing biometric information from a user. For example, the fingerprint of a user may be sensed and compared against a previously learned reference fingerprint to allow opening of the vehicle door or starting of the engine. As biometric sensors become more rugged, reliable and less expensive, their use in vehicle control systems is expected to increase. Unfortunately, conventional vehicle security systems using remote transmitters, transponders, and even biometric readers are still subject to a security threat based upon unauthorized learning of a uniquely coded transponder, token, or biometric characteristic, for example. Once such a code or identifying characteristic has been learned by a would-be thief without the owner's knowledge, the thief can return to the vehicle and defeat the security system.

SUMMARY OF THE INVENTION

In view of the foregoing background, it is therefore an object of the invention to provide a vehicle control system and related method including a biometric sensor and controller for reducing the risk of an unauthorized individual being able to control the vehicle function, such as to disarm the vehicle security system.

It is still another object of the present invention to provide a system and method for reducing the risk of an unauthorized individual controlling the function, and also permitting the owner to readily return the system to the correct operating condition after an unauthorized individual's biometric characteristic has been learned.

These and other objects, features, and advantages in accordance with the present invention are provided by a vehicle function control system including a biometric characteristic sensor, and a controller at the vehicle for controlling at least one vehicle function responsive to the biometric characteristic sensor. The controller preferably includes biometric characteristic learning means for learning the unique biometric characteristic of an individual to define at least one learned individual capable of controlling the vehicle function, and biometric characteristic verifying means for generating an indication relating to whether a new individual has been learned by the learning means to thereby alert the user of a potentially unauthorized individual capable of controlling the vehicle function.

The biometric sensor may be positioned at the vehicle or be carried by a handheld remote transmitter, for example. The biometric characteristic sensor may be one of a fingerprint sensor, a voice pattern sensor, a facial pattern sensor, a skin pattern sensor, a venous pattern sensor, a hand sensor, or a retinal scanner, for example.

The biometric characteristic learning means may be switchable between a learning mode permitting learning of at least the biometric characteristic of an individual, and a secure mode. In one embodiment, the biometric characteristic learning means may include biometric characteristic deleting means for deleting all prior learned individuals based upon entering the learning mode.

The biometric characteristic verifying means may further include learning mode entered indicating means for indicating that the learning mode has been entered. The learning mode entered indicating means may comprise time lapse means for indicating when the learning mode has last been entered. The time lapse means, in turn, may comprise means for progressively indicating a passage of time since the learning mode has last been entered.

Alternately, the biometric characteristic verifying means may include learned individual number indicating means for indicating a number of learned individuals. The biometric characteristic verifying means may also alternately include learned individual change indicating means for indicating a change in a number of learned individuals or means for generating an indication relating to whether a new individual has been learned by the learning means. The verifying means may further comprise activating means for causing the indicating means to generate an indication.

Another aspect of the invention relates to the ease of returning the system to operate from a previous authorized set of biometric characteristics or individuals. According to this aspect, the vehicle function control system preferably further includes biometric characteristic reset means for permitting the user to restore at least one previously learned individual and remove at least one more recently learned individual. The biometric characteristic verifying means may enter a warning mode and remains in the warning mode for a predetermined warning time responsive to a new individual being learned. In addition, learned biometric characteristics designated as current are capable of controlling at least one vehicle function, and characteristics designated hold are capable of being changed to current. Thus, the biometric characteristic reset means may include means for changing at least one biometric characteristic from current to hold responsive to learning a new biometric characteristic.

The biometric characteristic reset means preferably further comprises means for learning at least one new biometric characteristic as a temporary code which is also capable of controlling at least one vehicle function. The reset means may also include means for deleting hold biometric characteristics, and converting temporary biometric characteristics to current responsive to expiration of the predetermined warning time. In addition, the biometric characteristic reset means may delete temporary codes and maintain hold characteristics responsive to learning a new biometric characteristic when in the warning mode.

The biometric characteristic reset means may include restore means for restoring hold characteristics to current characteristics, and for deleting temporary characteristics responsive to learning a new biometric characteristic matching a hold characteristic and when in the warning mode. Also, the restore means may cause exit from the warning mode.

A method aspect of the invention is for controlling at least one vehicle function based upon a biometric characteristic of a user. The method preferably comprises the steps of: sensing the biometric characteristic of a user; providing a controller at the vehicle for controlling at least one vehicle function responsive to the biometric sensing; learning the biometric characteristic of at least one individual into the controller to define a learned individual capable of controlling the vehicle function; and generating an indication relating to whether a new individual has been learned into the controller to thereby alert the user of a potentially unauthorized individual capable of controlling the vehicle function. The method may also include the step of restoring at least one previously learned biometric characteristic and removing at least one more recently learned characteristic.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
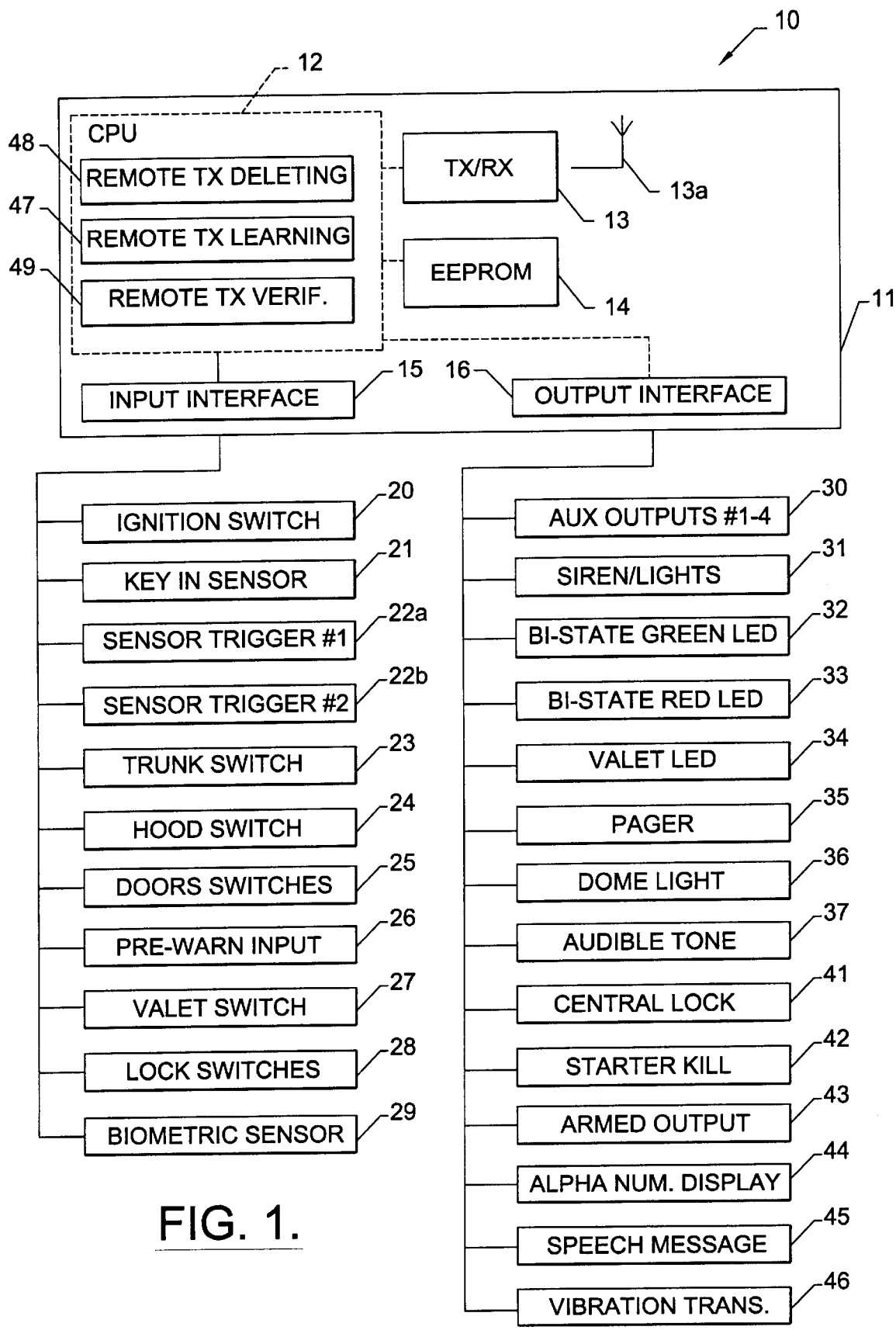
FIG. 1 is a schematic block diagram of the vehicle security system according to the invention.

Referring now to the schematic block diagram of FIG. 1, a vehicle security system 10 according to one aspect of the invention is first described. The security system includes a controller 11 which, in turn, in the illustrated embodiment, includes a central processing unit or microprocessor 12 operating under stored program control.

In the illustrated embodiment, a transmitter and receiver 13 are connected to the microprocessor 12 for receiving signals from a remote transmitter and for transmitting signals to a remote unit, as will be described in greater detail below. As would be readily understood by those skilled in the art, the transmitter portion of the controller 11 may not be needed in some embodiments of the invention, An antenna 13a is illustratively connected to the transmitter and receiver 13.

In the illustrated embodiment, the microprocessor is also operatively connected to a memory (EEPROM) 14 and an input interface 15 and an output interface 16. As would be readily understood by those skilled in the art, the microprocessor 12 may alternately or additionally have its own on-board memory.

The input interface 15 is illustratively connected to various vehicle input devices including: an ignition switch 20; a key in the ignition sensor 21; two zone sensors 22a, 22b; conventional trunk hood and door pin sensors or switches 23, 24, and 25, respectively; and door lock switches 28. In addition, a pre-warn sensor 26 and valet switch 27 also provide inputs to the controller 11 in the illustrated embodiment.

A biometric sensor 29 is also connected to the controller 11. The biometric sensor 29 may be any of a number of types, such as a sensor for fingerprints, retinal patterns, speech recognition patterns, facial recognition pattern, skin patterns, hand patterns, venous patterns, etc. as would be readily appreciated by those skilled in the art. The biometric sensor 29 is for sensing a unique characteristic of the individual which can be compared to stored reference data to determine whether the individual has previously been authorized to operate the controller 11 as will also be appreciated by those skilled in the art.

Figure 2:
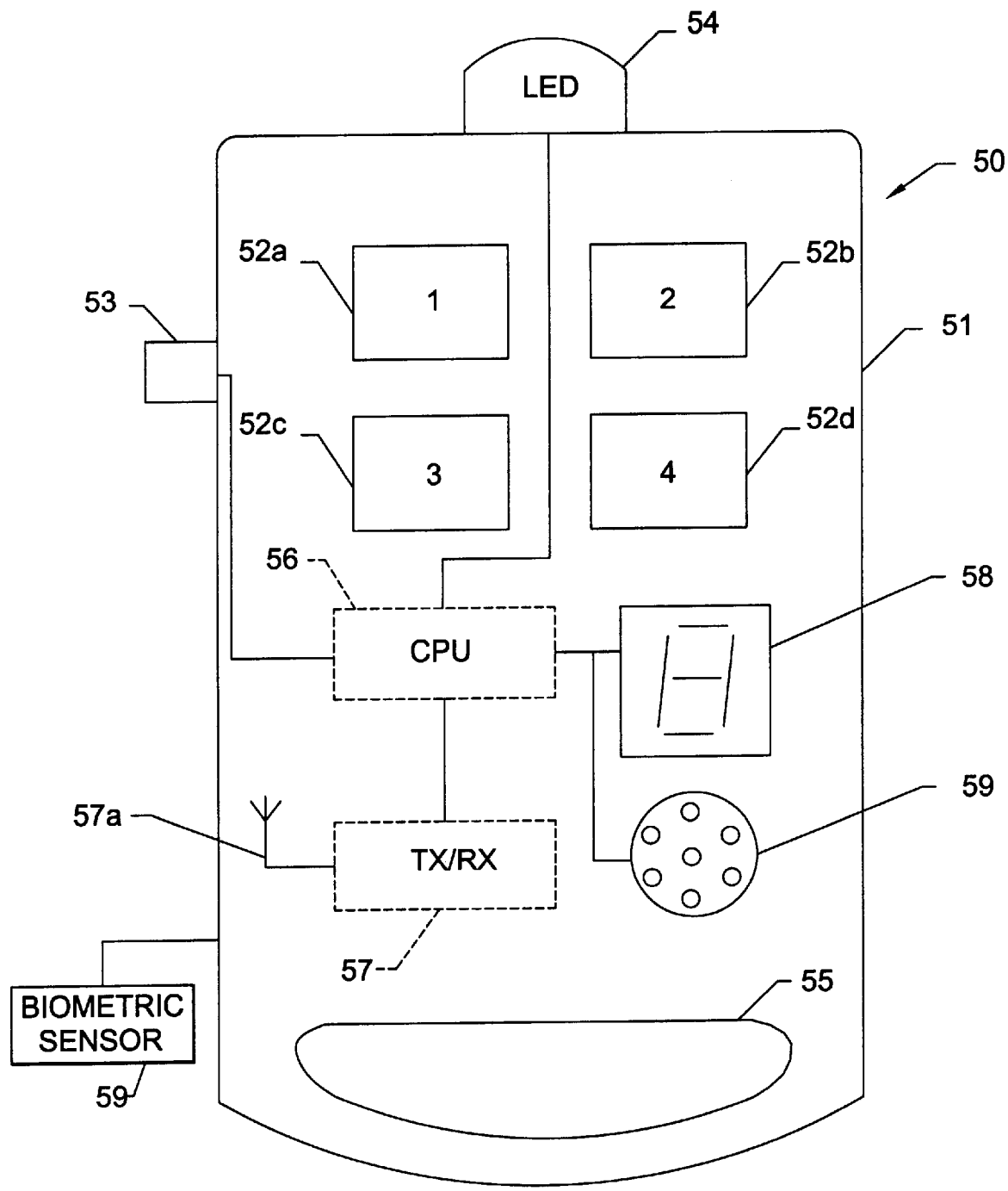
FIG. 2 is a schematic diagram of a remote transmitter for the vehicle security system according to the invention.

Other inputs are also contemplated by the present invention and are generally described herein by the term sensor. In addition, an input signal may also be received from a remote transmitter 50 (FIG. 2). As shown in FIG. 2, the remote transmitter 50 may also include a biometric sensor 59 mounted thereto. In particular, a fingerprint sensor of the integrated circuit type may be especially suitable as a biometric sensor 29, 59 given its compact size and ease of integration with other electronic components.

The output interface 16 of the controller 11 may preferably be connected to a plurality of output devices. As shown in FIG. 1, the outputs may include auxiliary relay outputs 30, such as for window control, remote starting, or a remote alarm indication, as would be readily understood by those skilled in the art. A siren and/or lights 31, and green and red light emitting diodes (LEDs) 32, 33 for dashboard mounting are also illustratively connected to the controller 11. Other outputs may be directed to a valet LED 34, a dome light 36, a central lock relay or lock control unit 41, a starter kill circuit 42, and an armed relay output 43. In addition, other outputs may be directed to one or more of an audible tone generator 37, an alphanumeric display 44, a speech message annunciator 45, and a vibration transducer 46, as will be readily appreciated by those skilled in the art. Other similar indicating devices are also contemplated by the present invention, as would be readily understood by those skilled in the art.

Referring now more particularly to FIG. 2, a remote transmitter 50 in accordance with the invention is described The remote transmitter 50 includes a housing 51 and a plurality of first momentary contact switches 52a–52d carried by the housing. A second momentary contact switch 53 and an indicating light, such as the illustrated LED 54 are also carried by or mounted on the housing 51. As would be readily understood by those skilled in the art, the remote transmitter 50 is typically relatively small and includes an opening 55 for facilitating connection to a vehicle key ring, for example. In addition, the remote transmitter 50 includes a central processing unit or microprocessor 56 operatively connected to the plurality of first switches 52a–52d, the second switch 53, LED 54, and biometric sensor 59. The biometric sensor 59 may be used to sense a biometric characteristic to be compared to stored biometric characteristic data. The sensed data, once obtained, is compared to reference data to determine whether the individual has been authorized to send the transmission, for example The remote transmitter 50 may transmit coded data representative of the sensed biometric characteristic, or may process the sensed biometric characteristic internally and permit or disable transmission based on the internal comparison as will be readily appreciated by those skilled in the art.

The microprocessor is also connected to a transmitter and/or receiver circuit 57 and its associated antenna 57a for transmitting and/or receiving signals to and from the controller 11 of the vehicle security system 10. Accordingly, the term "remote transmitter" is used broadly herein to describe the embodiment also including receiver means.

The remote transmitter 50 may also include a numeric or alphanumeric display 58, and a speaker 59 coupled to an audible tone generator or a speech message generator, as may be provided by the microprocessor 56. A vibration transducer, not shown, may also be incorporated into the remote transmitter 50 for communicating to the user as would be readily understood by those skilled in the art.

The controller 11 preferably includes remote transmitter learning means 47 for permitting the addition or learning of a coded remote transmitter 50 to be capable of switching the controller between armed and disarmed modes, for example. In the armed mode the controller 11 is capable of generating an alarm via alarm indication means, such as the siren and/or flashing lights 31. The controller 11 generates the alarm responsive to at least one of the vehicle sensors, such as the trunk, hood and door switches 23, 24 and 25, or the other sensors 22a, 22b as would be readily understood by those skilled in the art. In the disarmed mode the controller 11 does not generate an alarm responsive to one or more of the vehicle sensors so that the user may enter the vehicle, for example.

The controller 11 preferably comprises remote transmitter verifying means 49 for generating an indication relating to whether a new uniquely coded remote transmitter has been learned by the remote transmitter learning means 47. In addition, the remote transmitter learning means 47 is preferably switchable between a learning or program mode permitting learning of a unique code of a remote transmitter 50, and a secure mode. As would be readily understood by those skilled in the art, the learning mode may be entered for a relatively short predetermined time and then automatically revert back to the secure mode to reduce the possibility of unauthorized remote transmitters being learned.

In one embodiment, the remote transmitter verifying means 49 comprises learning mode entered indicating means for indicating that the learning mode of the remote transmitter learning means has been entered. More particularly, the learning mode entered indicating means preferably comprises time lapse means for indicating when the learning mode of the remote transmitter learning means has last been entered. This indication can be provided by progressively indicating the elapsed time since the learning mode has last been entered.

According to another approach or embodiment of the invention, the remote transmitter verifying means 49 preferably comprises learned remote transmitter number indicating means for indicating a number of learned remote transmitters. In an embodiment where all remote transmitters are deleted when a new one is learned, the number of learned transmitters may change indicating that an unauthorized transmitter has been learned. Alternately, the remote transmitter verifying means 49 may comprise learned remote transmitter change indicating means for directly indicating a change in a number of learned remote transmitters. In yet another embodiment, the remote transmitter verifying means 49 preferably comprises learned remote transmitter code change indicating means for indicating a change in a unique code of the learned remote transmitters.

The remote transmitter verifying means 49 preferably includes remote transmitter indicating means for providing the indication. In other words, indicating means, such as a dashboard mounted light emitting diode 32, 33, may be flashed a number of times corresponding to the number of coded remote transmitters in one embodiment. Accordingly, the user is ensured that only the coded remote transmitters 50 under his control may operate the vehicle security system 10, and that no other remote transmitters have been surreptitiously coded to operate the controller.

Other embodiments of remote transmitter indicating means include, for example, the audible tone generator 37, numeric display 44, speech message generator 45 and vibration transducer 46 driven by the controller and associated with the vehicle. The dome light 36, headlights 31, and other LED's 32, 33 and 34 may also be used to give an indication to the user relating to the remote transmitters coded to operate the controller 11.

The remote transmitter indicating means may also be associated with or carried by a remote transmitter 50, or may be otherwise remote from the vehicle and be communicated to the remote site via a satellite or cellular telephone connection. For example, the indication means may be provided by a light 54, an alphanumeric display 58, a speech or tone generator 59, and a vibration transducer, for example, carried by the remote transmitter 50 (FIG. 2). Alternately, a remote monitoring station may be provided to monitor one or a plurality of vehicles in cooperation with the transmitter verifying means of each respective vehicle. In addition, a pager may be carried by the user to provide the indication.

The indication given to the user may preferably be the number of coded remote transmitters currently capable of switching the controller 11 to the disarmed mode from the armed mode. Alternately, the indication may be related to a change in the number of coded remote transmitters or a change in a code of a learned remote transmitter. The various indicating means and remote transmitter verifying means may also be used to simply alert the user that the learning mode has been recently entered. Accordingly, the remote transmitter verifying means 49 provides an indication relating to whether one or more remote transmitters has been added or learned without the owner's consent or knowledge. The indicating means may also further comprise repeater means for repeating an indication relating to the number of coded transmitters 50 for a predetermined time period or a predetermined number of repetitions.

Should the user determine that an unauthorized remote transmitter has been added or learned to operate the controller 11, the controller in one embodiment also preferably includes remote transmitter deleting means 48 for permitting deletion of the newly added unauthorized remote transmitter or all of the coded remote transmitters 50 capable of switching the controller between the armed and disarmed modes. In one embodiment, the deleting means preferably comprises means for deleting all of the previously learned remote transmitters. All of the previously learned remote transmitters may be deleted based upon entering the learning mode, that is, either when the learning mode is initially entered or when the first remote transmitter is learned, for example. If all of the coded remote transmitters are deleted by the deleting means 48, the authorized transmitters may thereafter be added by the remote transmitter learning means 47 as would be readily understood by those skilled in the art. As described in greater detail below, in another embodiment, transmitter code reset means may be provided to remove a newly learned code and restore a previously learned code.

The vehicle security system 10 also preferably includes activating means for activating the remote transmitter indicating means responsive to a predetermined condition. For example, the indicating means may be triggered by the activating means responsive to operation of one of a signal from the remote transmitter 50; a manually operable switch, such as the valet switch 27; an ignition switch 20, including a key in the switch sensor 21; a door position switch 25; and a door lock switch 28. For example, the valet switch, ignition switch, remote transmitter buttons, or other manual switches could be operated in a predetermined sequence to activate the indicating means. Other similar means for activating the indicating means are also contemplated by the invention, and will be readily appreciated by those skilled in the art.

Figure 3:
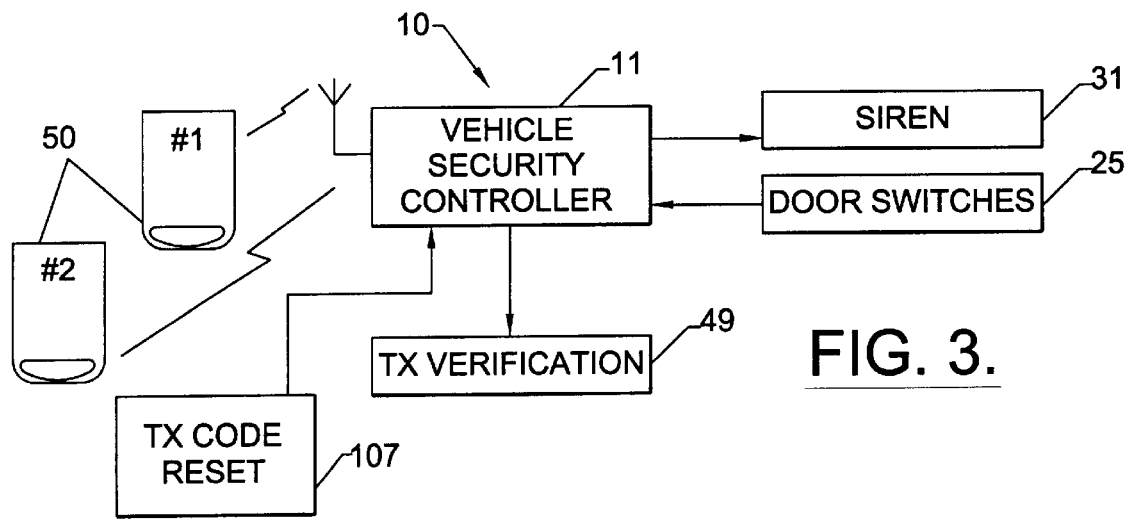
FIG. 3 is a schematic diagram of a remote control vehicle security system according to the present invention.

In brief review, the vehicle security system 10 is schematically illustrated in FIG. 3 including the controller 11 along with the siren 31 and door switches 25. The transmitter verifying means 49 is illustrated in a separate block for clarity, although those of skill in the art will recognize that the logic features of the transmitter verifying means may be readily implemented via the microprocessor of the controller. Two illustrated remote transmitters 50 are capable of switching the controller 11 between armed and disarmed modes. When in the armed mode, tripping of the vehicle door switches 25 may typically activate the siren 31. In addition, the door switches 25 may also be used as part of the activation means to cause the transmitter verifying means to give an indication relating to an unauthorized remote transmitter. Also shown schematically is transmitter code reset means 107 which provides the user with a relatively simple way to reinstate previous learned transmitter codes as will be described in greater detail below.

Figure 4:
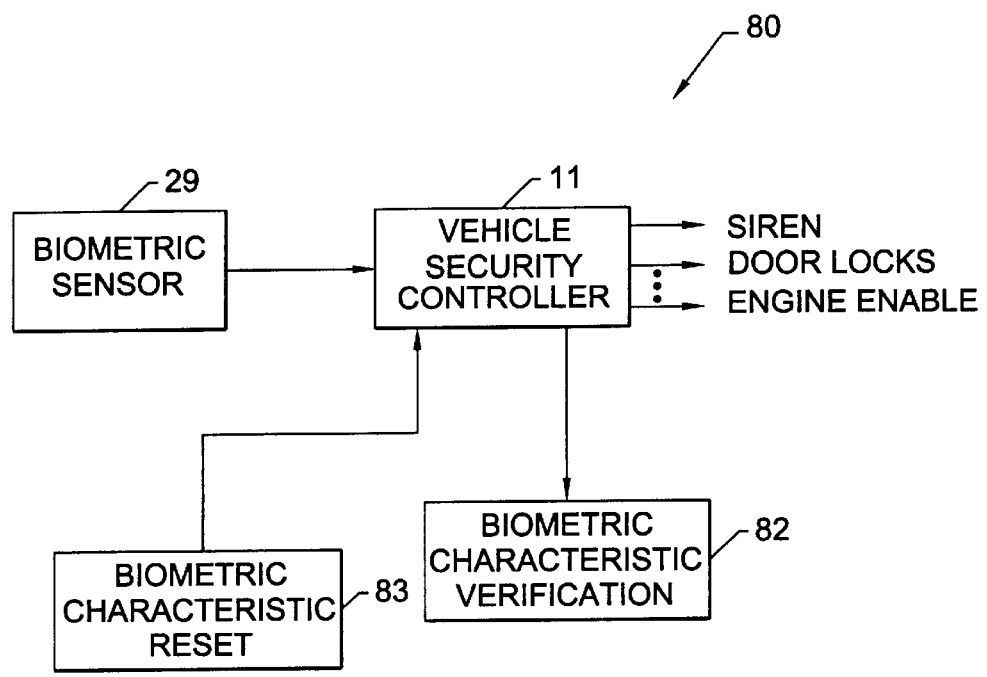
FIG. 4 is a schematic diagram of a vehicle security control system including a biometric characteristic sensor according to the invention.
Figure 5:
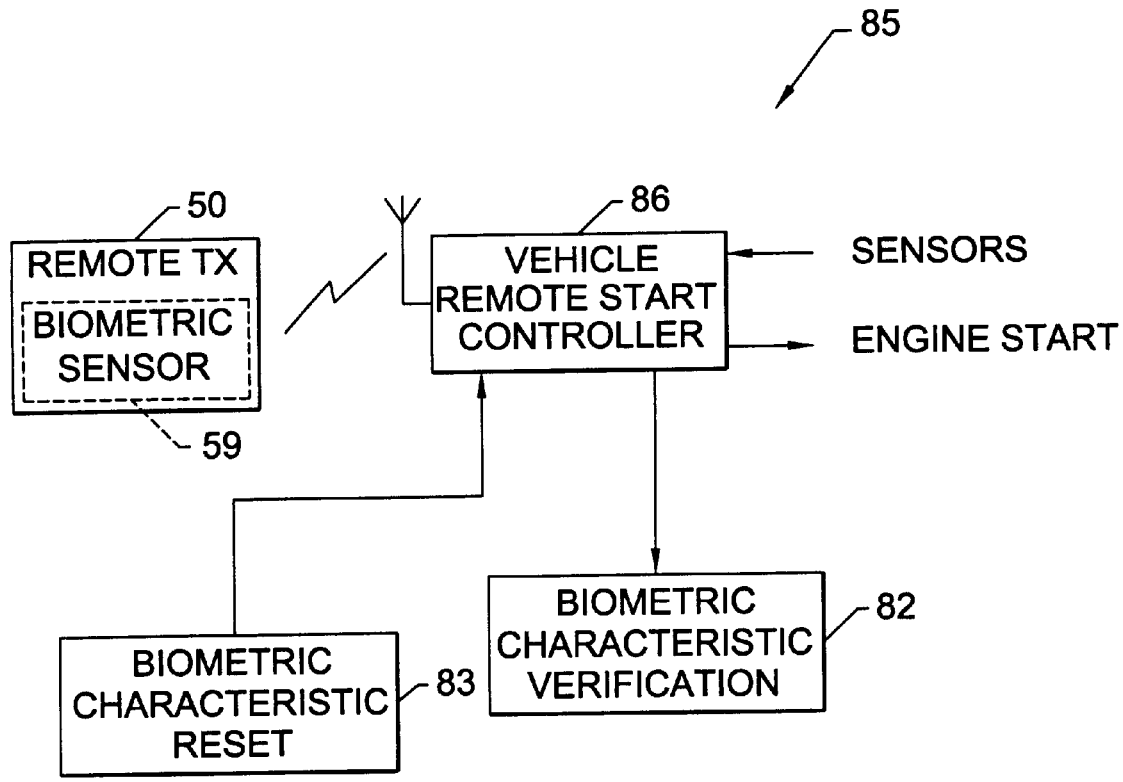
FIG. 5 is a schematic diagram of a vehicle remote engine starting control system including a biometric characteristic sensor carried by a remote transmitter according to the present invention.
Figure 6:
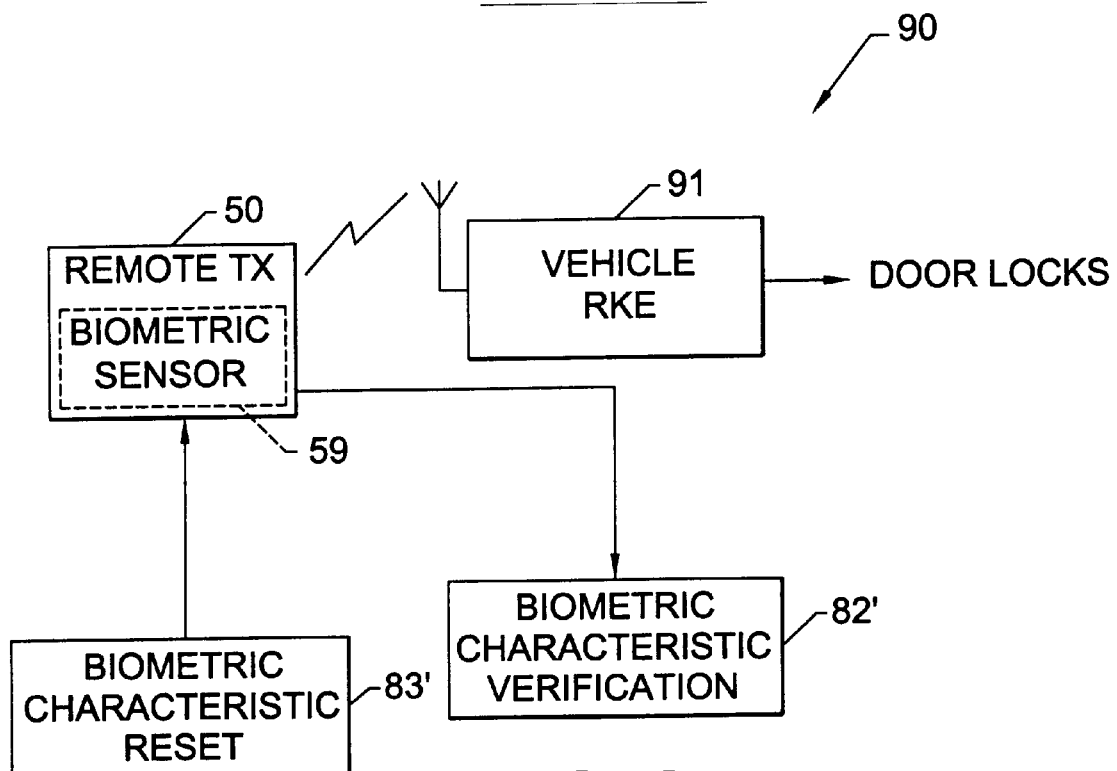
FIG. 6 is a schematic diagram of a vehicle remote keyless entry control system including a biometric characteristic sensor carried by a remote transmitter according to the invention.

Referring now additionally to FIGS. 4–6, various embodiments of the biometric characteristic verification feature of the present invention are further described. Of course, the same principles and features apply to the biometric characteristic verification features as to the remote transmitter verification features as will be readily appreciated by those skilled in the art.

Referring more particularly to FIG. 4, another aspect of the vehicle security system 10 is explained. The controller 11 is connected to the biometric sensor 29 for sensing a biometric characteristic of the user, such as a fingerprint, voice pattern, etc. as described above. If the sensed biometric characteristic matches reference data from a previously learned individual, then the controller 11 may be switched between armed and disarmed modes, starting enabled, or the doors may be locked or unlocked, etc. Accordingly, to prevent unauthorized learning of a new biometric characteristic from a new individual, the system 10 illustratively includes biometric characteristic verification means 82. The biometric characteristic verification means 82 preferably operates along the lines as described above for the transmitter verification feature for remote transmitters 50 as will be readily understood by those skilled in the art without further discussion. In addition, the biometric verification means 82 may give an indication via any of the approaches as described above for the remote transmitter verification means 49.

The security system 10 also includes the schematically illustrated biometric characteristic reset means 83. The biometric characteristic reset means 83 is similar to the transmitter code reset means 107 as mentioned briefly above and described in further detail below. The biometric characterization reset means 83 permits the user to readily reactivate or reset previously learned biometric characteristics and delete new biometric characteristics which may have been surreptitiously added.

The embodiment of the vehicle control system 85 shown in FIG. 5 is for remote vehicle starting and includes the illustrated remote start controller 86. The controller 86 receives signals from the remote transmitter 50, such as to remotely start the vehicle as will be readily appreciated by those skilled in the art. The remote start system 85 operates based upon confirmation of the correct authorized user as determined by the biometric characteristic sensor 59. In other words, the remote transmitter 50 may include a controller or processor for matching a sensed characteristic to a stored characteristic before granting the user the ability to remote start the engine. Alternately, the biometric characteristic could be sensed, transmitted to the remote start controller 86 and the remote start controller could determine whether the biometric characteristic matches an authorized or previously learned individual.

The remote start system 85 also includes the biometric characteristic reset means 83, and biometric verification means 82 illustratively connected to the controller 86. Those of skill in the art will appreciate that these features could be incorporated into the remote transmitter 50 as well.

Referring now additionally to FIG. 6, inclusion of the biometric verification means 82' and the biometric characteristic reset means 83' into the remote transmitter 50 is illustrated. The control system 90 is illustratively a remote keyless entry (RKE) system. Accordingly, the system 90 includes an RKE controller 91 for operating the vehicle door locks as will be readily appreciated by those skilled in the art. Those of skill in the art will appreciate other vehicle related control features that are contemplated by the present invention in addition to engine starting and door lock control.

Returning now again to the concept of remote transmitter verification. A method aspect in accordance with the present invention is for increasing security in permitting remote control of a function associated with a vehicle and using at least one uniquely coded remote transmitter 50, and a receiver 13 within the vehicle for receiving a signal from the uniquely coded remote transmitter. The method preferably comprises the steps of: storing in a memory 14 a unique code of a remote transmitter 50 to define a learned remote transmitter capable of causing performance of a function associated with the vehicle, and generating an indication relating to whether a new uniquely coded remote transmitter has been stored in the memory to thereby alert the user of a potentially unauthorized learned remote transmitter capable of remotely performing the function associated with the vehicle.

Figure 7:
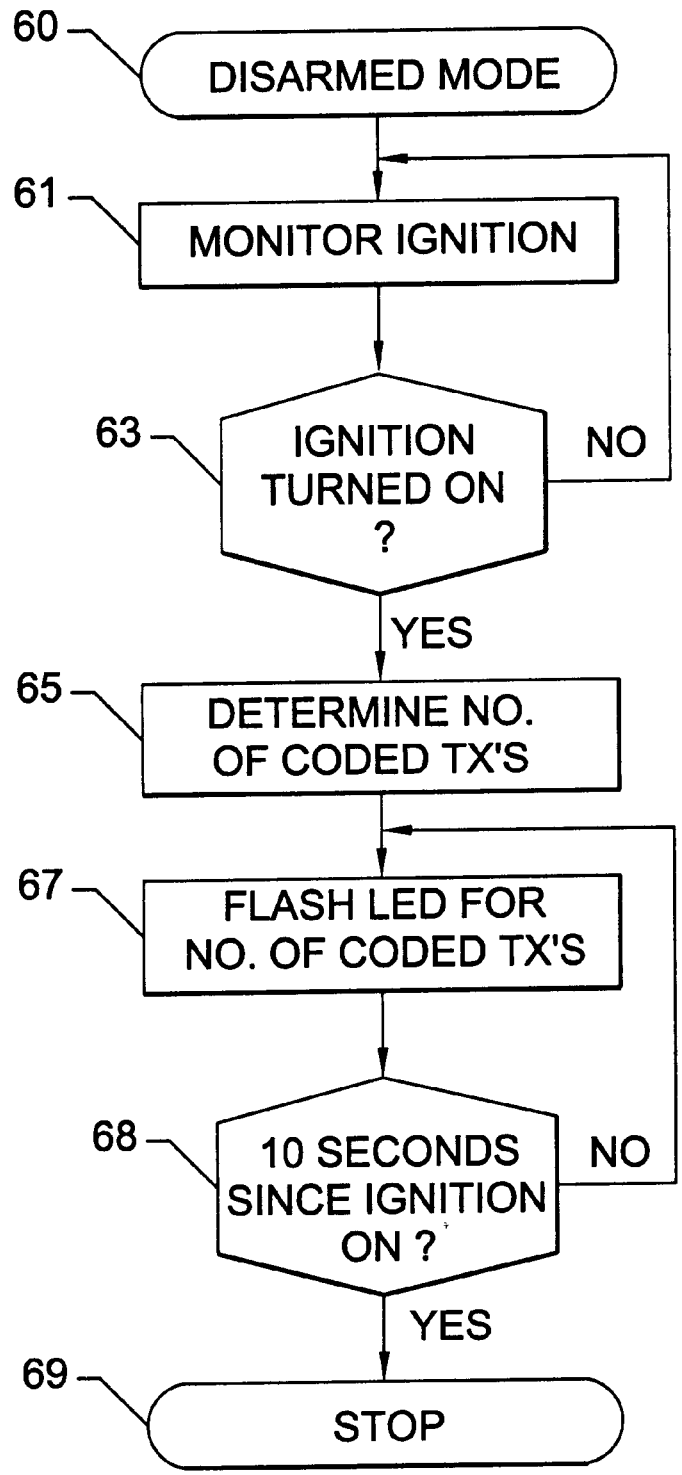
FIGS. 7 and 8 are flow charts illustrating examples of remote transmitter verification according to the invention.

A particular example of the transmitter verification feature of the present invention is explained with further reference to the flow chart of FIG. 7. In this example, the vehicle security system controller 11 (FIGS. 1 and 3) preferably includes ignition switch monitoring means 20 (FIG. 1) for determining whether a vehicle ignition switch is in an off position or an on position as monitored at Block 61 and when the controller is in the disarmed mode (Block 60). If the ignition is switched on (Block 63), the number of coded remote transmitters 50 (FIGS. 1–3) is determined or verified (Block 65). The controller 11 also preferably includes activating means for activating an LED 32, 33 (FIG. 1) to indicate the number of coded transmitters 50 at Block 67 responsive to turning the vehicle ignition to the on position and when the controller 11 is in the disarmed mode. The number of coded transmitters 50 may be repeated for a predetermined time, such as ten seconds, at Block 68. The verification feature is then stopped (Block 69). If unsure, the driver could turn the ignition off, and then back to the on position, to again verify the number of coded remote transmitters 50. Those of skill in the art will readily appreciate alternate embodiments incorporating other indicating means or activating means as described in greater detail herein. This same procedure or an equivalent thereto, can also be used to verify and indicate the biometric characteristics for individuals whose characteristics are learned into the control system as shown in FIGS. 4–6 in accordance with the present invention.

Figure 8:
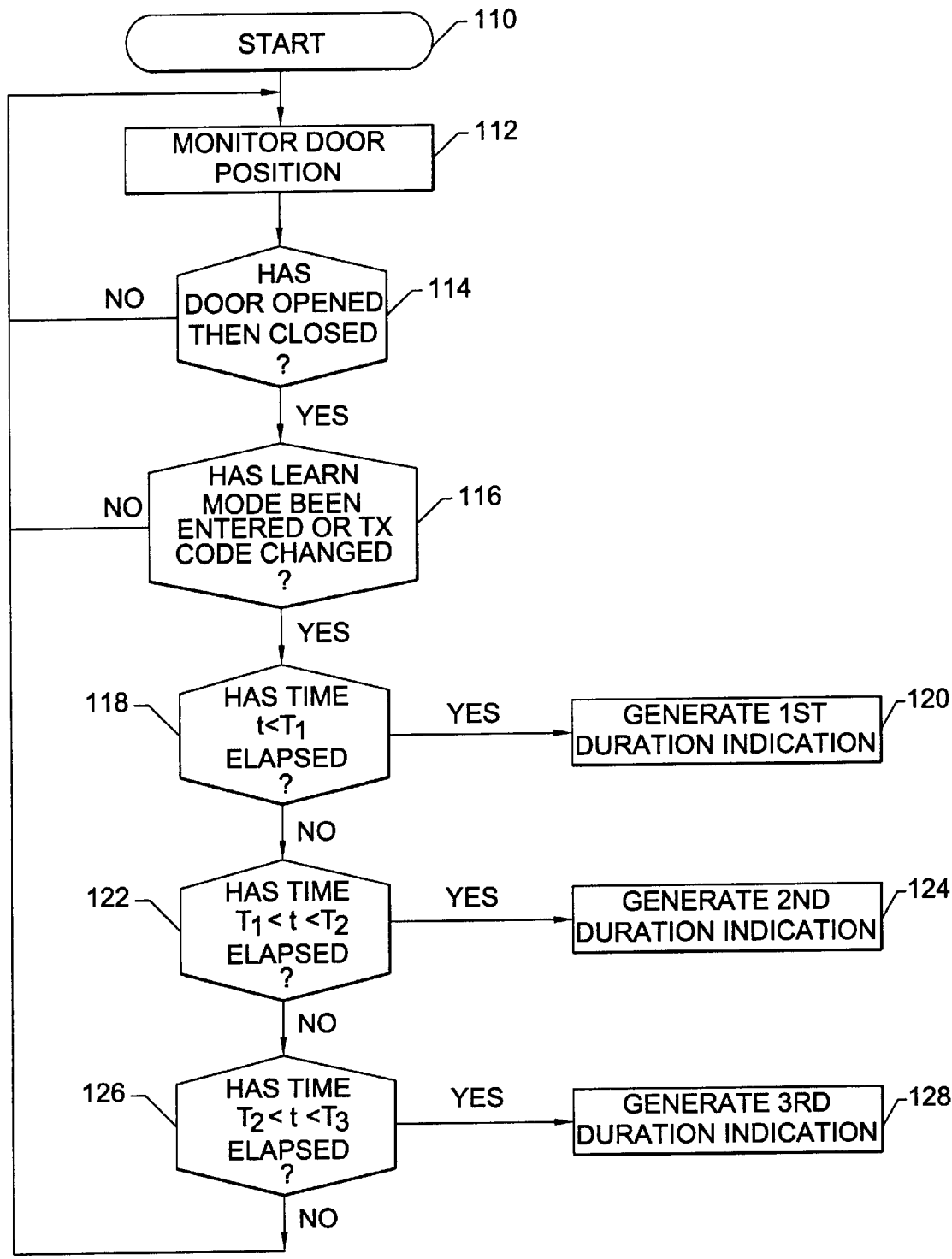

Referring to the flow chart of FIG. 8, another variation of operation of the vehicle security system 10 is now explained. From the start (Block 110), the door position is monitored at Block 112. If a door, such as the driver's door, has been determined at Block 114 to have been opened and closed, it is next determined whether the remote transmitter learn mode has been entered or a remote transmitter code changed at Block 116. If the door has not been opened and closed, or the learn mode or transmitter code not changed, the system returns to monitoring the door position at Block 112.

If the learn mode has been entered or the code changed, the elapsed time t since that event is compared against a threshold T1 at Block 118. If the elapsed time t is less that T1, then a first duration signal may be generated at Block 120. If the elapsed time t is between T1 and a second threshold T2 as determined at Block 122, then a second duration indication can be generated (Block 124). Similarly, if the elapsed time t is between T2 and a third threshold T3 as determined at Block 126, then a third duration indication may be given at Block 128. The sequence can be extended or shortened as would be readily appreciated by those skilled in the art.

For example, if the learn mode has been entered within the prior forty-eight hours, an indicating light may be illuminated for a thirty second duration responsive to the activation means. The duration could thereafter be decremented five seconds for each 48 hours of elapsed time, so that the indication would eventually automatically terminate with the passage of sufficient time. As another example, the light could be illuminated for ninety seconds the first day, and decrement ten seconds each day thereafter. It is desirable that the indication inform the user of how recently the learn mode or transmitter change has been made so that the user may correlate the change with someone's ability to access the system. An appropriate voice message could also be generated alerting the user to when the learning mode was last entered, for example. Again, this variation of verification and indication for a coded remote transmitter may be directly applicable and used with the biometric characteristic verification and indication as shown in FIGS. 3–6 as will be readily appreciated by those skilled in the art.

Another aspect of the invention relates to the transmitter code reset means which permits the user to restore at least one previously learned code and remove at least one more recently learned code. The remote transmitter verifying means may enter a warning mode and remain in the warning mode for a predetermined warning time responsive to a new uniquely coded remote transmitter being learned. In addition, the learned codes designated as current are capable of switching the alarm controller, for a vehicle security system, for example, and the codes designated hold are capable of being changed to current. Accordingly, the transmitter code reset means preferably comprises means for changing at least one code from current to hold responsive to learning a new uniquely coded transmitter.

The transmitter code reset means may further comprise means for learning at least one new uniquely coded transmitter as a temporary code which is also capable of switching the alarm controller. The transmitter code reset means may further include means for deleting hold codes, and converting temporary codes to current codes responsive to expiration of the predetermined warning time. Also, the transmitter code reset means may delete temporary codes and maintain hold codes responsive to learning a new uniquely coded transmitter when in the warning mode.

The transmitter code reset means may also include restore means for restoring hold codes to current codes, and for deleting temporary codes responsive to learning a new uniquely coded remote transmitter matching a hold code and when in the warning mode. The restore means may also further comprise means for exiting the warning mode.

The various means associated with the transmitter code reset feature may be readily implemented using the processor of the controller, for example, or may be implemented using conventional logic and signal processing circuitry as will be readily appreciated by those skilled in the art. In addition, transmitter code reset means may be used in remote starting, remote keyless entry and other similar applications as will also be readily appreciated by those skilled in the art.

Figure 9:
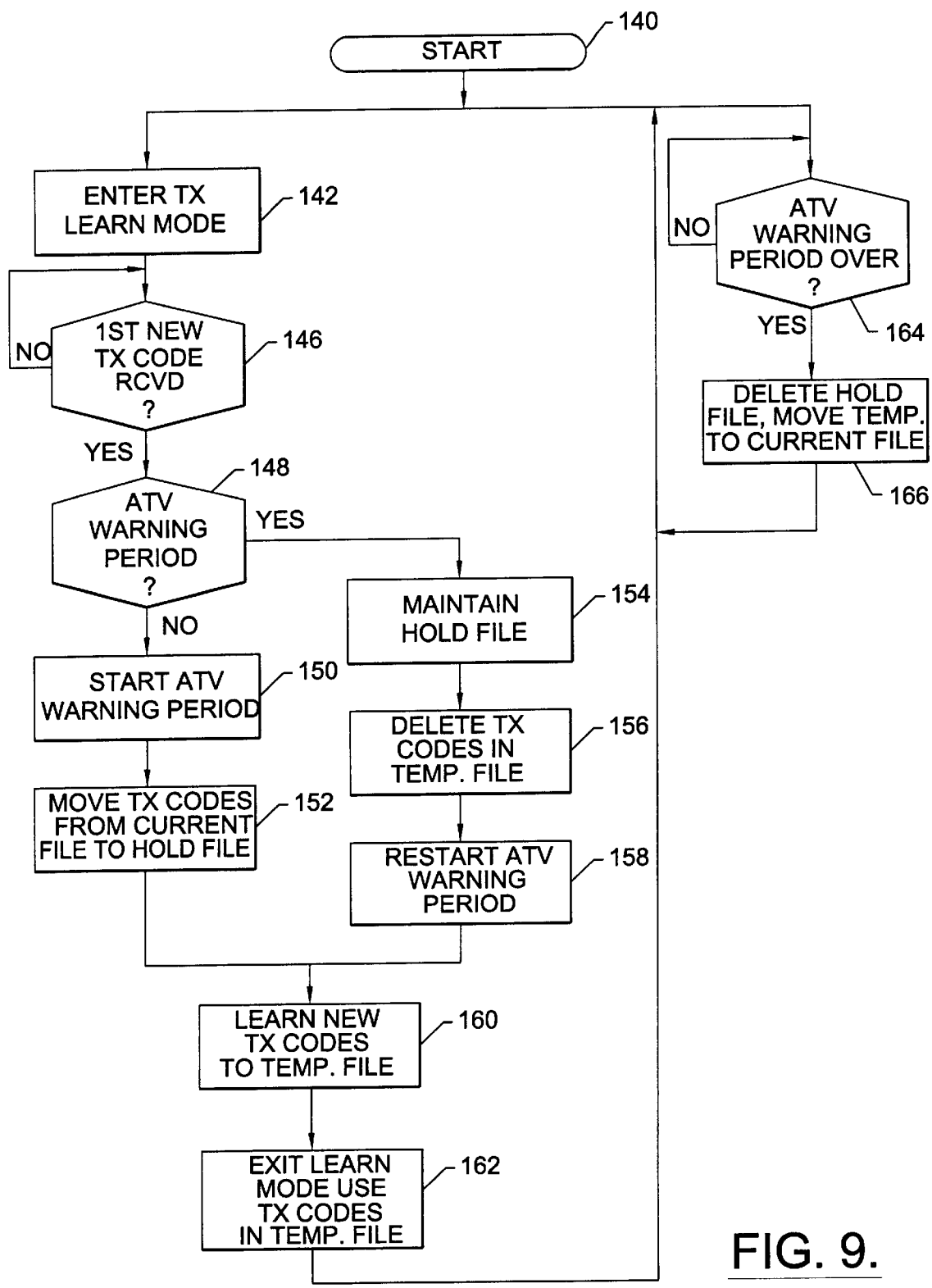
FIG. 9 is a first flow chart illustrating a portion of the transmitter code reset feature in accordance with the present invention.

Turning now additionally to the flow chart of FIG. 9 operation of the transmitter code reset function of the present invention is further described. From the start (Block 140), the user may enter the controller into the transmitter learning mode at Block 146. Entry into the learning mode has been described above, however, those of skill in the art will appreciate that there are many other equivalent techniques to cause the controller to enter the transmitter learning mode.

Once in the learning mode, it is determined at Block 146 whether a new transmitter code has been received. If a code is received, then at Block 148 it is determined whether the 48 hour Automatic Transmitter Verification (ATV) warning period as described above is still in progress. Of course the time could be changed to any suitable value depending on the application. If the controller is not currently in the ATV warning period, then the ATV warning period is started at Block 150, and remote transmitter codes are moved from a current file to a hold file. As would be readily appreciated by those skilled in the art, the codes may not necessarily be transferred to another portion of memory, for example, rather a designation for the code may simply be updated.

At Block 160, the controller learns the newly received transmitter codes to a so-called temporary file. The newly learned transmitter codes remain in the temporary file or keep their temporary designation and are used to operate the controller upon exit from the learning mode (Block 162) as will be readily appreciated by those skilled in the art.

Turning now briefly to the upper right-hand portion of FIG. 9, at Block 164 it is determined whether the ATV warning period has expired. If so, the transmitter codes in the hold file are deleted, and the transmitter codes in the temporary file are moved to the current file. In other words, once the ATV warning period expires, the hold file contents are deleted and the temporary codes become the current codes. The current code operate the controller until the learning mode is again entered.

If during the learning mode, the ATV warning period was already active as determined at Block 148, the hold file contents are maintained (Block 154). In addition, the transmitter codes in the temporary file are deleted at Block 156. Accordingly, this defeats the would-be thief from entering the learning mode several times without the user's knowledge. In other words, the codes in the hold file should be those previously authorized by the user.

At Block 158 the ATV warning period may be restarted. Thereafter, the controller learns the new transmitter codes into the temporary file (Block 160), and the system operates with the new temporary codes upon exit from the learning mode (Block 162).

Figure 10:
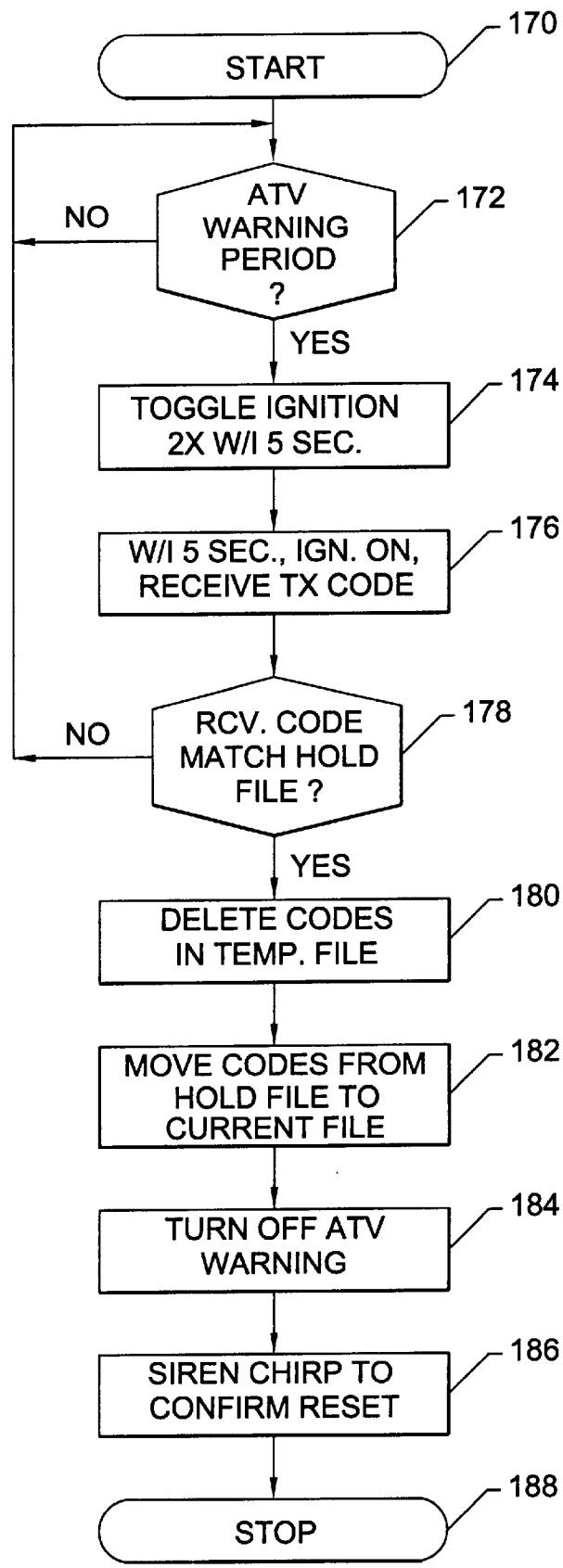
FIG. 10 is a second flow illustrating another portion of the transmitter code reset feature in accordance with the present invention.

Turning now additionally to the flow chart of FIG. 10, a method for returning the proper transmitter codes to operate the system and to delete any unauthorized codes is explained. The user desires both security and convenience. From the start (Block 170), if the system is still in the ATV warning period as determined at Block 172, then the user may toggle the ignition switch on and off two times within 5 seconds (Block 174). The user may then transmit a code from a transmitter in his possession, and if the ignition is on, and was toggled within the last 5 seconds, then the system will compare the received code with the hold file codes (Block 178).

If the just received code matches a code in the hold file, then the codes in the temporary file are deleted at Block 180. This removes the temporary codes that may have been surreptitiously added by a would-be thief. In addition, the transmitter codes from the hold file are then moved to the current file (Block 182). This restores the user's previous authorized hold codes to operate the system. The ATV warning is turned off at Block 184, and the siren may be chirped at Block 186, before stopping (Block 188), to thereby provide the user with confirmation that the codes from the temporary file have been deleted, and the codes from the hold file have been re-activated or changed to the current designation or file.

Of course, the biometric characteristic reset features and functions may be the same as for the remote transmitter code reset features. The biometric characteristics reset means may also provide the ability for the user to reset a prior group of individuals once alerted by the biometric characteristic verification feature.

Further information relating to the vehicle security system and aspects thereof may be found in parent patent U.S. Pat. No. 5,654,688, assigned to the assignee of the present invention and incorporated herein by reference in its entirety. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A vehicle security system comprising:
    at least one vehicle security sensor;
    an alarm controller switchable between an armed mode for generating an alarm responsive to the at least one vehicle security sensor, and a disarmed mode;
    a biometric characteristic sensor for sensing a unique biometric characteristic of an individual;
    said alarm controller further comprising biometric learning means cooperating with said biometric characteristic sensor for learning a unique biometric characteristic of an individual to define a learned individual for switching said alarm controller; and
    learned individual verifying means for generating an indication relating to whether a new individual has been learned by said biometric learning means to thereby provide an indication of a potentially unauthorized learned individual.

2. A vehicle security system according to claim 1 wherein said biometric characteristic sensor is positioned at the vehicle.

3. A vehicle security system according to claim 1 further comprising a remote transmitter to be carried by an individual when away from the vehicle; and wherein said biometric characteristic sensor is carried by the remote transmitter.

4. A vehicle security system according to claim 1 wherein said biometric characteristic sensor comprises at least one of a fingerprint sensor, a voice pattern sensor, a facial pattern sensor, a skin pattern sensor, a hand pattern sensor, a venous pattern sensor, and a retinal pattern sensor.

5. A vehicle security system according to claim 1 wherein said biometric learning means is switchable between a learning mode for learning a unique biometric characteristic of a new individual, and a normal mode.

6. A vehicle security system according to claim 5 wherein said biometric learning means comprises biometric characteristic deleting means for deleting all prior learned individuals based upon entering the learning mode.

7. A vehicle security system according to claim 5 wherein said learned individual verifying means comprises learning mode entered indicating means for indicating that the learning mode of said biometric learning means has been entered.

8. A vehicle security system according to claim 7 wherein said learning mode entered indicating means comprises time lapse means for indicating when the learning mode of said biometric learning means has last been entered.

9. A vehicle security system according to claim 8 wherein said time lapse means comprises means for progressively indicating a passage of time since the learning mode has last been entered.

10. A vehicle security system according to claim 1 wherein said learned individual verifying means comprises learned individual number indicating means for indicating a number of learned individuals.

11. A vehicle security system according to claim 1 wherein said learned individual verifying means comprises learned individual change indicating means for indicating a change in a number of learned individuals.

12. A vehicle security system according to claim 1 wherein said learned individual verifying means comprises learned individual identity change indicating means for indicating a change in the identity of learned individuals.

13. A vehicle security system according to claim 1 wherein said learned individual verifying means comprises at least one of a light at the vehicle, a visual display at the vehicle, a vibration transducer at the vehicle, a speech message generator at the vehicle, and an audible signal generator at the vehicle.

14. A vehicle security system according to claim 1 wherein said learned individual verifying means comprises at least one of a light remote from the vehicle, a visual display remote from the vehicle, a vibration transducer remote from the vehicle, a speech message generator remote from the vehicle, and an audible signal generator remote from the vehicle.

15. A vehicle security system according to claim 1 wherein said learned individual verifying means further comprises activating means for causing generation of the indication.

16. A vehicle security system according to claim 15 wherein said activating means comprises vehicle activating means associated with the vehicle; and wherein said vehicle activating means comprises at least one of a manually operated switch, a vehicle switch, and a vehicle sensor.

17. A vehicle security system according to claim 15 wherein said activating means comprises remote activating means remote from the vehicle; and wherein said remote activating means comprises a remote transmitter.

18. A vehicle security system according to claim 1 further comprising biometric characteristic reset means for permitting the user to restore at least one previously learned biometric characteristic and remove at least one more recently learned biometric characteristic.

19. A vehicle security system according to claim 18 wherein said biometric characteristic verifying means enters a warning mode and remains in the warning mode for a predetermined warning time responsive to a new biometric characteristic being learned.

20. A vehicle security system according to claim 19 wherein learned biometric characteristics designated as current are for switching said alarm controller; wherein biometric characteristics designated hold are changeable to current; and wherein said biometric characteristic reset means comprises means for changing at least one biometric characteristic from current to hold responsive to learning a new biometric characteristic.

21. A vehicle security system according to claim 20 wherein said biometric characteristic reset means further comprises means for learning at least one new biometric characteristic as a temporary biometric characteristic which is also for switching said alarm controller.

22. A vehicle security system according to claim 21 wherein said biometric characteristic reset means further comprises means for deleting hold biometric characteristics, and converting temporary biometric characteristics to current biometric characteristics responsive to expiration of the predetermined warning time.

23. A vehicle security system according to claim 22 wherein said biometric characteristic reset means comprises means for deleting temporary biometric characteristics and maintaining hold biometric characteristics responsive to learning a new biometric characteristic when in the warning mode.

24. A vehicle security system according to claim 23 wherein said biometric characteristic reset means further comprises restore means for restoring hold biometric characteristics to current biometric characteristics, and for deleting temporary biometric characteristics responsive to learning a new biometric characteristic matching a hold biometric characteristic and when in the warning mode.

25. A vehicle security system according to claim 24 wherein said restore means further comprises means for exiting the warning mode.

26. A vehicle function control system responsive to at least one unique biometric characteristic of an individual, the vehicle Function control system comprising:
   a biometric characteristic sensor for sensing a unique biometric characteristic of an individual; and
   a controller at the vehicle for controlling at least one vehicle function responsive to said biometric characteristic sensor, said controller comprising
      biometric learning means cooperating with said biometric characteristic sensor for learning a unique biometric characteristic of an individual to define a learned individual for controlling the at least one vehicle function, and
      learned individual verifying means for generating an indication relating to whether a new individual has been learned by said biometric learning means to thereby provide an indication of a potentially unauthorized learned individual.

27. A vehicle control system according to claim 26 wherein said controller controls at least one of vehicle access, vehicle starting, and a vehicle alarm indication.

28. A vehicle control system according to claim 26 wherein said biometric characteristic sensor is positioned at the vehicle.

29. A vehicle control system according to claim 28 wherein said restore means further comprises means for exiting the warning mode.

30. A vehicle control system according to claim 26 further comprising a remote transmitter to be carried by an individual when away from the vehicle; and wherein said biometric characteristic sensor is carried by the remote transmitter.

31. A vehicle control system according to claim 26 wherein said biometric characteristic sensor comprises at least one of a fingerprint sensor, a voice pattern sensor, a facial pattern sensor, a skin pattern sensor, a hand pattern sensor, a venous pattern sensor, and a retinal pattern sensor.

32. A vehicle control system according to claim 26 wherein said biometric learning means is switchable between a learning mode for learning a unique biometric characteristic of a new individual, and a normal mode.

33. A vehicle control system according to claim 32 wherein said biometric learning means comprises biometric characteristic deleting means for deleting all prior learned individuals based upon entering the learning mode.

34. A vehicle control system according to claim 32 wherein said learned individual verifying means comprises learning mode entered indicating means for indicating that the learning mode of said biometric learning means has been entered.

35. A vehicle control system according to claim 34 wherein said learning mode entered indicating means comprises time lapse means for indicating when the learning mode of said biometric learning means has last been entered.

36. A vehicle control system according to claim 35 wherein said time lapse means comprises means for progressively indicating a passage of time since the learning mode has last been entered.

37. A vehicle control system according to claim 26 wherein said learned individual verifying means comprises learned individual number indicating means for indicating a number of learned individuals.

38. A vehicle control system according to claim 26 wherein said learned individual verifying means comprises learned individual change indicating means for indicating a change in a number of learned individuals.

39. A vehicle control system according to claim 26 wherein said learned individual verifying means comprises learned individual identity change indicating means for indicating a change in the identity of learned individuals.

40. A vehicle control system according to claim 26 wherein said learned individual verifying means comprises at least one of a light at the vehicle, a visual display at the vehicle, a vibration transducer at the vehicle, a speech message generator at the vehicle, and an audible signal generator at the vehicle.

41. A vehicle control system according to claim 26 wherein said learned individual verifying means comprises at least one of a light remote from the vehicle, a visual display remote from the vehicle, a vibration transducer remote from the vehicle, a speech message generator remote from the vehicle, and an audible signal generator remote from the vehicle.

42. A vehicle control system according to claim 26 wherein said learned individual verifying means further comprises activating means for causing generation of the indication.

43. A vehicle control system according to claim 42 wherein said activating means comprises vehicle activating means associated with the vehicle; and wherein said vehicle activating means comprises at least one of a manually operated switch, a vehicle switch, and a vehicle sensor.

44. A vehicle control system according to claim 42 wherein said activating means comprises remote activating means remote from the vehicle; and wherein said remote activating means comprises a remote transmitter.

45. A vehicle control system according to claim 26 further comprising biometric characteristic reset means for permitting the user to restore at least one previously learned biometric characteristic and remove at least one more recently learned biometric characteristic.

46. A vehicle control system according to claim 45 wherein said biometric characteristic verifying means enters a warning mode and remains in the warning mode for a predetermined warning time responsive to a new biometric characteristic being learned.

47. A vehicle control system according to claim 46 wherein learned biometric characteristics designated as current are for controlling the at least one vehicle function; wherein biometric characteristics designated hold are changeable to current; and wherein said biometric characteristic reset means comprises means for changing at least one biometric characteristic from current to hold responsive to learning a new biometric characteristic.

48. A vehicle control system according to claim 47 wherein said biometric characteristic reset means further comprises means for learning at least one new biometric characteristic as a temporary biometric characteristic which is also capable controlling the at least one vehicle function.

49. A vehicle control system according to claim 48 wherein said biometric characteristic reset means further comprises means for deleting hold biometric characteristics, and converting temporary biometric characteristics to current biometric characteristics responsive to expiration of the predetermined warning time.

50. A vehicle control system according to claim 49 wherein said biometric characteristic reset means comprises means for deleting temporary biometric characteristics and maintaining hold biometric characteristics responsive to learning a new biometric characteristic when in the warning mode.

51. A vehicle control system according to claim 50 wherein said biometric characteristic reset means further comprises restore means for restoring hold biometric characteristics to current biometric characteristics, and for deleting temporary biometric characteristics responsive to learning a new biometric characteristic matching a hold biometric characteristic and when in the warning mode.

52. A vehicle function control system responsive to at least one unique biometric characteristic of an individual, the vehicle function control system comprising:

a biometric characteristic sensor for sensing a unique biometric characteristic of an individual; and a controller at the vehicle for controlling at least one vehicle function responsive to said biometric characteristic sensor, said controller comprising biometric learning means cooperating with said biometric characteristic sensor for learning a unique biometric characteristic of an individual to define a learned individual for controlling the at least one vehicle function, learned individual verifying means for generating an indication relating to whether a new individual has been learned by said biometric learning means to thereby provide an indication of a potentially unauthorized learned individual, and biometric characteristic reset means for permitting the user to restore at least one previously learned biometric characteristic and remove at least one more recently learned biometric characteristic.

53. A vehicle control system according to claim 52 wherein said biometric characteristic verifying means enters a warning mode and remains in the warning mode for a predetermined warning time responsive to a new biometric characteristic being learned.

54. A vehicle control system according to claim 53 wherein learned biometric characteristics designated as current are for controlling the at least one vehicle function; wherein biometric characteristics designated hold are changeable to current; and wherein said biometric characteristic reset means comprises means for changing at least one biometric characteristic from current to hold responsive to learning a new biometric characteristic.

55. A vehicle control system according to claim 54 wherein said biometric characteristic reset means further comprises means for learning at least one new biometric characteristic as a temporary biometric characteristic which is also for controlling the at least one vehicle function.

56. A vehicle control system according to claim 55 wherein said biometric characteristic reset means further comprises means for deleting hold biometric characteristics, and converting temporary biometric characteristics to current biometric characteristics responsive to expiration of the predetermined warning time.

57. A vehicle control system according to claim 56 wherein said biometric characteristic reset means comprises means for deleting temporary biometric characteristics and maintaining hold biometric characteristics responsive to learning a new biometric characteristic when in the warning mode.

58. A vehicle control system according to claim 57 wherein said biometric characteristic reset means further comprises restore means for restoring hold biometric characteristics to current biometric characteristics, and for deleting temporary biometric characteristics responsive to learning a new biometric characteristic matching a hold biometric characteristic and when in the warning mode.

59. A vehicle control system according to claim 58 wherein said restore means further comprises means for exiting the warning mode.

60. A vehicle control system according to claim 52 wherein said controller controls at least one of vehicle access, vehicle starting, and a vehicle alarm indication.

61. A vehicle control system according to claim 52 wherein said biometric characteristic sensor is positioned at the vehicle.

62. A vehicle control system according to claim 52 further comprising a remote transmitter to be carried by an individual when away from the vehicle; and wherein said biometric characteristic sensor is carried by the remote transmitter.

63. A vehicle control system according to claim 52 wherein said biometric characteristic sensor comprises at least one of a fingerprint sensor, a voice pattern sensor, a facial pattern sensor, a skin pattern sensor, a hand pattern sensor, a venous pattern sensor, and a retinal pattern sensor.

64. A method for controlling at least one vehicle function based upon a biometric characteristic of a user, the method comprising:

sensing the biometric characteristic of a user;

providing a controller at the vehicle for controlling at least one vehicle function responsive to sensing the biometric characteristic;

learning the unique biometric characteristic of the at least one individual into the controller to define a learned individual for controlling the at least one vehicle function; and generating an indication relating to whether a new individual has been learned into the controller to thereby alert the user of a potentially unauthorized individual.

65. A method according to claim 64 further comprising controlling at least one of vehicle starting, vehicle access, and a vehicle alarm responsive to sensing the learned biometric characteristic.

66. A method according to claim 64 wherein verifying comprises indicating that a learning mode has been entered.

67. A method according to claim 66 wherein verifying comprises indicating a number of learned individuals.

68. A method according to claim 66 wherein verifying comprises indicating a change in a number of learned individuals.

69. A method according to claim 66 wherein verifying comprises generating an indication relating to whether a new individual has been learned.

70. A method according to claim 66 further comprising restoring at least one previously learned biometric characteristic and removing at least one more recently learned biometric characteristic.

* * * * *